United States Patent
Davis et al.

(10) Patent No.: US 9,092,228 B2
(45) Date of Patent: Jul. 28, 2015

(54) SYSTEMS AND METHODS FOR SOFTWARE INSTRUCTION TRANSLATION FROM A HIGH-LEVEL LANGUAGE TO A SPECIALIZED INSTRUCTION SET

(71) Applicant: TEXAS INSTRUMENTS INCORPORATED, Dallas, TX (US)

(72) Inventors: Alan L. Davis, Sugar Land, TX (US); Ching-Yu Hung, Plano, TX (US); Jadadeesh Sankaran, Allen, TX (US); James Nagurne, Stafford, TX (US); Mel Alan Phipps, Sugar Land, TX (US); Ajay Jayaraj, Sugar Land, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 228 days.

(21) Appl. No.: 13/743,555

(22) Filed: Jan. 17, 2013

(65) Prior Publication Data

US 2013/0185703 A1    Jul. 18, 2013

Related U.S. Application Data

(60) Provisional application No. 61/587,165, filed on Jan. 17, 2012.

(51) Int. Cl.
| | |
|---|---|
| *G05B 19/04* | (2006.01) |
| *G06F 15/00* | (2006.01) |
| *G06F 15/76* | (2006.01) |
| *H04L 29/06* | (2006.01) |
| *G06F 11/00* | (2006.01) |
| *G01R 31/28* | (2006.01) |
| *G06F 17/00* | (2006.01) |
| *G06F 17/28* | (2006.01) |
| *G06F 9/44* | (2006.01) |
| *G06F 9/45* | (2006.01) |

(52) U.S. Cl.
CPC . *G06F 8/41* (2013.01); *G06F 8/447* (2013.01)

(58) Field of Classification Search
CPC . G06F 12/0862; G06F 9/3851; G06F 9/3012; G06F 9/30141; G06F 11/3466; G06F 8/43
See application file for complete search history.

(56) References Cited

U.S. PATENT DOCUMENTS

| | | | | |
|---|---|---|---|---|
| 5,127,104 | A * | 6/1992 | Dennis | 712/201 |
| 5,185,745 | A * | 2/1993 | Manca, Jr. | 714/726 |
| 5,768,592 | A * | 6/1998 | Chang | 717/160 |
| 5,781,779 | A * | 7/1998 | Gilbert et al. | 717/147 |
| 5,946,673 | A * | 8/1999 | Francone et al. | 700/246 |
| 6,745,384 | B1 * | 6/2004 | Biggerstaff | 717/156 |
| 8,046,563 | B1 * | 10/2011 | Agarwal et al. | 712/13 |
| 2003/0014624 | A1 * | 1/2003 | Maturana et al. | 713/151 |
| 2006/0129933 | A1 * | 6/2006 | Land et al. | 715/723 |
| 2007/0300204 | A1 * | 12/2007 | Andreev et al. | 717/104 |
| 2008/0270103 | A1 * | 10/2008 | Kaszynski et al. | 714/49 |
| 2012/0216012 | A1 * | 8/2012 | Vorbach et al. | 712/11 |

* cited by examiner

*Primary Examiner* — Don Wong
*Assistant Examiner* — Anibal Rivera
(74) *Attorney, Agent, or Firm* — Robert D. Marshall, Jr.; Frank D. Cimino

(57) ABSTRACT

A computer system includes a processor and program storage coupled to the processor. The program storage stores a software instruction translator that, when executed by the processor, is configured to receive source code and translate the source code to a low-level language. The source code is restricted to a subset of a high-level language and the low-level language is a specialized instruction set. Each statement of the subset of the high-level language directly maps to an instruction of the low-level language.

17 Claims, 3 Drawing Sheets

SYSTEMS AND METHODS FOR SOFTWARE INSTRUCTION TRANSLATION FROM A HIGH-LEVEL LANGUAGE TO A SPECIALIZED INSTRUCTION SET

CROSS-REFERENCE TO RELATED APPLICATION

The present application claims priority to U.S. Provisional Patent Application No. 61/587,165, filed on Jan. 17, 2012; which is hereby incorporated herein by reference.

BACKGROUND

Various processor designs include processors or coprocessors that are intended to accelerate execution of a given set of processing tasks. Often times, these processors or coprocessors, which may be referred to as "accelerators," achieve good cost or energy efficiency in particular processing tasks, such as scaling, filtering, transformation, sum of absolute differences, etc. To achieve good efficiency, some accelerators utilize a specialized instruction set that is designed to execute in a highly efficient manner for a given set of tasks.

Writing software code in a specialized instruction set is arduous for programmers because they are required to learn both a new language and its associated syntax. Additionally, debugging software code written in a specialized instruction set may only be performed on machines that can compile the specialized instruction set, which may be inconvenient. However, high-level programming languages such as C may contain many statements that cannot be effectively compiled to the specialized instruction set for execution on an accelerator utilizing that specialized instruction set. Further, statements of a high-level programming language may map to tens or even hundreds of low-level instructions in the specialized instruction set, which reduces the efficiency of code generated for execution by the accelerator using a high-level programming language. Consequently, a programming language that is familiar to programmers, may be easily debugged, and maintains the efficiencies of a target specialized instruction set when translated to the specialized instruction set is desirable.

SUMMARY

The problems noted above are solved in large part by a computer system that includes a processor and program storage coupled to the processor. The program storage stores a software instruction translator that, when executed by the processor, is configured to receive source code and translate the source code to a low-level language. The source code is restricted to a subset of a high-level language and the low-level language is a specialized instruction set. Each statement of the subset of the high-level language directly maps to an instruction of the low-level language.

In other embodiments, a method includes receiving source code that is restricted to a subset of a high-level language and translating the source code to a low-level language. The low-level language is a specialized instruction set and each statement of the subset of the high-level language directly maps to an instruction of the low-level language.

In still other embodiments, a non-transitory computer-readable medium contains instructions that, when executed by a processor, cause the processor to receive source code that is restricted to a subset of a high-level language and translate the source code to a low-level language. The low-level language comprises a specialized instruction set and each statement of the subset of the high-level language directly maps to an instruction of the low-level language.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
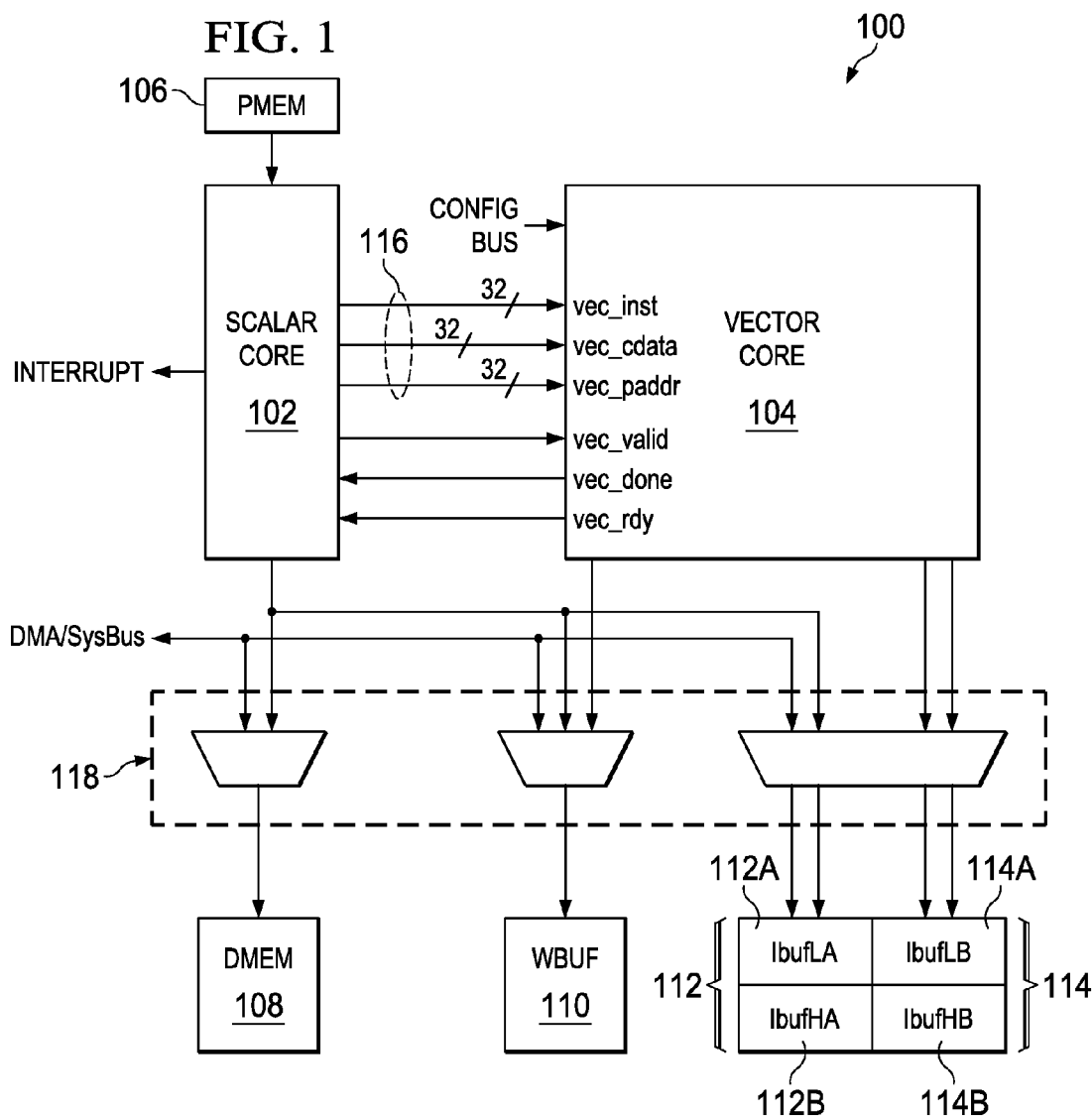
FIG. 1 shows a block diagram of an exemplary processor in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. Further, the term "software" includes any executable code capable of running on a processor, regardless of the media used to store the software. Thus, code stored in memory (e.g., non-volatile memory), and sometimes referred to as "embedded firmware," is included within the definition of software. The recitation "based on" is intended to mean "based at least in part on." Therefore, if X is based on Y, X may be based on Y and any number of other factors. The terms "alternate," "alternating" and the like are used to designate every other one of a series.

As used herein, the term "high-level programming language" or "high-level language" refers to a programming language that may be compiled into an assembly language or machine code for processors having different architectures. As an example, C is a high-level language because a program written in C may be compiled into assembly language for many different processor architectures. Although high-level languages generally have a higher level of abstraction relative to an assembly language or machine language of the processor, this is not required.

As used herein, the term "low-level programming language" or "low-level language" refers to an assembly language or machine code of a processor. Low-level languages are specific to a particular computer architecture, in contrast to high-level programming languages, which may be compiled into different assembly languages for a number of computer architectures.

As used herein, the term "target processor" refers to a processor for which a high-level language is compiled for execution.

As used herein, the term "specialized instruction set" refers to an assembly language or machine code instruction set of a target processor, where the instruction set cannot support at least one statement of a high-level language. That is, at least one statement of the high-level language cannot be compiled for execution on a target processor having a specialized instruction set relative to the high-level language.

As used herein, the term "specialized processor" or "specialized target processor" refers to a processor having a specialized instruction set.

As used herein, the term "software instruction translator" refers to a computer program or set of programs that receives source code as an input and transforms the source code into another computer language.

As used herein, the term "subset" refers to a reduced portion of a high-level programming language, such that all statements contained in the subset are valid statements of the high-level programming language, but not all statements of the high-level programming language are translatable by a software instruction translator that only accepts a subset of the high-level programming language as input.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

FIG. 1 shows an exemplary block diagram of a processor 100. The processor 100 includes a scalar processor core 102 and a vector coprocessor core 104. The vector coprocessor core 104 may be used as a signal processor for processing signal data (e.g., image signals) in a highly efficient manner. The processor 100 also includes a program memory 106, a data memory 108, a working buffer memory 110, an A buffer memory 112, and a B buffer memory 114. The A and B buffer memories 112, 114 are partitioned into a low and high A buffer memory (112A, 112B) and a low and high B buffer memory (114A, 114B) to allow simultaneous direct memory access (DMA) and access by the cores 102, 104. To support N-way processing by the vector coprocessor core 104, each of the working buffer memory 110, A buffer memory 112, and B buffer memory 114 may comprise N simultaneously accessible banks. For example, if the vector coprocessor core 104 is an 8-way single-instruction multiple-data (SIMD) core, then each of the working, A, and B buffers 110, 112, 114 may comprise 8 banks each of suitable word width (e.g., 32 bits or more wide) that are simultaneously accessible by the vector coprocessor core 104. Switching network 118 provide signal routing between the memories 108, 110, 112, 114 and the various systems that share access to memory (e.g., DMA and the processor cores 102, 104).

The program memory 106 stores instructions to be executed by the scalar core 102 interspersed with instructions to be executed by the vector coprocessor core 104. The scalar processor core 102 accesses the program memory 106 and retrieves therefrom an instruction stream comprising instructions to be executed by the scalar processor core 102 and instructions to be executed by the vector coprocessor core 104. The scalar processor core 102 identifies instructions to be executed by the vector coprocessor core 104 and provides the instructions to the vector coprocessor core 104 via a coprocessor interface 116. In some embodiments, the scalar processor 102 provides vector instructions, control data, and/or loop instruction program memory addresses to the vector coprocessor core 104 via the coprocessor interface 116. The loop instruction program memory addresses may be provided concurrently with a loop instruction, and the control data may be provided concurrently with a control register load instruction. In some embodiments, the program memory 106 may be a cache memory that fetches instructions from a memory external to the processor 100 and provides the instructions to the scalar processor core 102.

Figure 2:
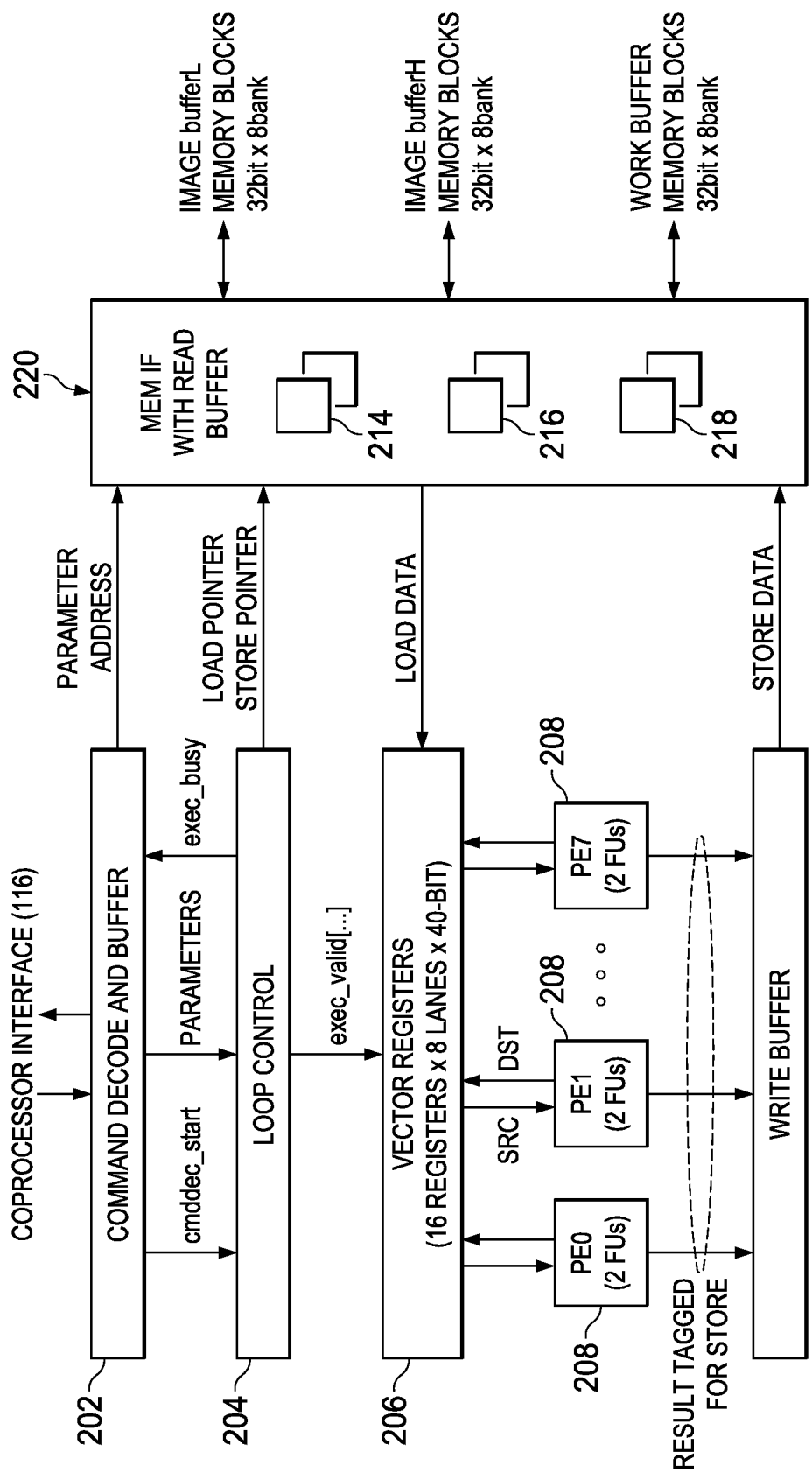
FIG. 2 shows a block diagram of an exemplary vector core coprocessor in accordance with various embodiments.

FIG. 2 shows an exemplary block diagram of the vector coprocessor core 104. The vector coprocessor core 104 may be an SIMD processor that executes a block of vector instructions iteratively as a plurality of nested loops. In some embodiments, the vector coprocessor core 104 includes built-in looping control that executes instructions in four or more nested loops with zero looping overhead. The vector coprocessor core 104 includes a command decoder/buffer 202, loop control logic 204, a vector register file 206, processing elements 208, load units 214, store units 216, and address generators 218. The load units 214 and store units 216 access the working buffer memory 110, an A buffer memory 112, and a B buffer memory 114 through a memory interface 220. The address generators 218 compute the addresses applied by the load and store units 214, 216 for accessing memory. Each address generator 218 is capable of multi-dimensional addressing that computes an address based on the indices of the nested loops and corresponding constants (e.g., address=base+$i_1$*$const_1$+$i_2$*$const_2$+$i_3$*$const_3$+$i_4$*$const_4$) for 4-dimensional addressing where $i_n$ is a loop index for one of four nested loops).

The memory interface 220 connects the vector coprocessor core 104 via a lane of interconnect corresponding to each bank of each of memories 110, 112, 114. Thus, a memory 110, 112, 114 having eight parallel banks (e.g., 32-bit banks) connects to the vector coprocessor core 104 via eight parallel memory lanes, where each memory lane connects to a port of the memory interface 220. Memory lanes that connect to adjacent ports of the memory interface 220 are termed adjacent memory lanes.

The vector coprocessor core 104 is N-way SIMD, where in the embodiment of FIG. 2, N=8. N may be different in other embodiments. Thus, the coprocessor core 104 includes N processing lanes, where each lane includes a processing element 208 and a set of registers of the vector register file 206 that provide operands to and store results generated by the processing element 208. Each processing element 208 may include a plurality of function units that operate on (e.g., multiply, add, compare, etc.) the operands provided by the register file 206. Accordingly, the register file 206 is N-way and includes storage of a plurality of entries. For example, the register file 206 may be N×16 where the register file includes sixteen registers for each of the N ways of the vector coprocessor core 104. Corresponding registers of adjacent ways are termed adjacent registers. Thus, a register R0 of SIMD way 0 is adjacent to register R0 of SIMD way 1. The processing elements 208 and the registers of the register file 206 are sized to process data values of various sizes. In some embodiments, the processing elements 208 and the registers of the register file 206 are sized to process 40 bit and smaller data values (e.g., 32 bit, 16 bit, 8, bit). Other embodiments may be sized to process different data value sizes.

As noted above, the vector coprocessor core 104 repeatedly executes a vector instruction sequence (referred to as a vector command) within a nested loop. The nested looping is controlled by the loop control logic 204. While the vector coprocessor core 104 is executing vector commands, the scalar core 102 continues to decode and execute the instruction stream retrieved from program memory 106, until execution of a coprocessor synchronization instruction forces the scalar core 102 to stall for vector coprocessor core 104 vector command completion. While the scalar core 102 is stalled, the scalar core 102 may service interrupts unless interrupt processing is disabled.

Thus, in the above example where the vector instruction sequence is required to be executed in a nested loop, the vector coprocessor core 104 executes instructions according to a narrowly-defined control structure. In other embodiments, different accelerators execute instructions according to different control structures, such as different levels of nesting; branches based on restricted, specialized, or multi-way conditions; or predicated execution. As explained above, it is not desirable to program specialized processors such as the vector coprocessor core 104 using a low-level language such as assembly language. The instruction set of such processors are specialized in ways that are specific to their control structures (such as nested loops, multi-way branches, or predication) and data paths (such as SIMD, application-specific operations, and multi-element operations). An assembly language programmer must learn these operations in detail and how to express them using the specialized low-level language, which may be particularly difficult for such processors. Thus, it is advantageous to write a program in a high-level language for execution on a specialized target processor (e.g., the vector coprocessor core 104 having a specialized instruction set).

One potential issue common to narrowly-defined instruction execution control structures is that a software program written in a high-level language, such as C, may not be able to be compiled into a set of instructions that adheres to the requirements of the control structure without incurring unacceptable overhead. Additionally, where the target processor (e.g., the vector coprocessor core 104) executes a specialized instruction set, some statements of the high-level language may not be compiled for efficient execution on the target processor.

Figure 3:
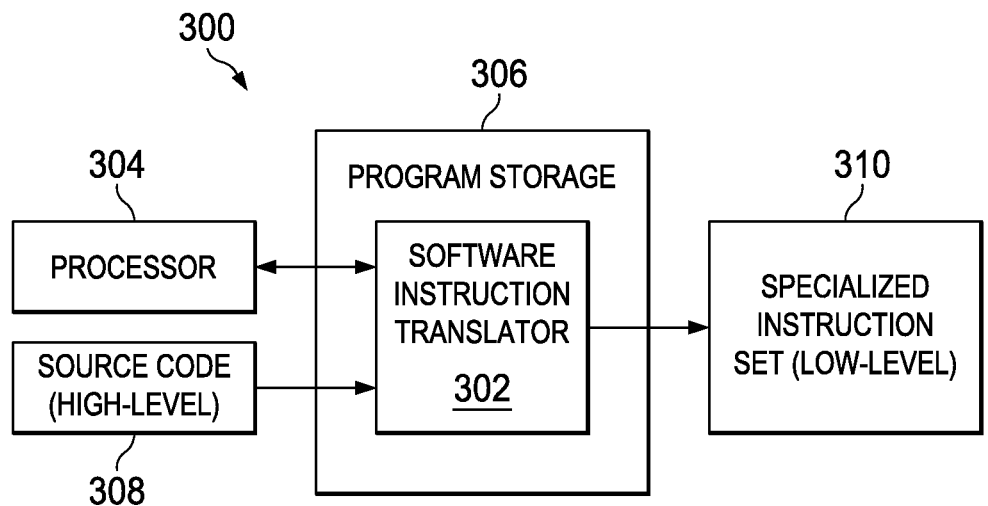
FIG. 3 shows a block diagram of a computer system including a software instruction translator in accordance with various embodiments.

Turning now to FIG. 3, a system 300 including a software instruction translator 302 is shown in accordance with various embodiments. The system 300 includes a processor 304 coupled to program storage 306. The processor 304 may be a central processing unit (CPU) of a general purpose computer while the program storage 306 may be a hard disk drive (HDD), random access memory (RAM), or other non-transitory computer-readable medium that is accessible by the processor 304. The program storage 306 stores the software instruction translator 302, which is executable by the processor 304.

The software instruction translator 302 receives source code 308, which is a high-level program that may be loaded into program storage 306 or into another storage medium as is known in the art, and translates the source code 308 of the computer program to a specialized instruction set 310, which is a low-level language, for execution on a target processor. In accordance with various embodiments, the software instruction translator 302 is configured to translate only a subset of a high-level language, such as C++, and the source code 308 is written using that subset of the high-level language. Additionally, some target processors, such as the vector core coprocessor 104, may employ a rigid control structure to enhance efficiency and performance, and in these cases the software instruction translator 302 may only translate functions and/or source code 308 that adheres to the control structure required by the specialized processor or can naturally be expressed by that control structure. As explained above, the control structure may require that source code 308 be written in a nested-loop format, where all statements exist inside the nested loop structure.

All statements contained in the subset are valid statements of the high-level language, but statements outside of the subset of the high-level language are not translatable by the software instruction translator 302. Additionally, in accordance with various embodiments, the low-level language 310 is a specialized instruction set, which is an assembly language or machine code instruction set that cannot support at least one statement of the high-level language. The target processor is referred to as a specialized target processor because the specialized processor operates on the specialized instruction set.

As explained above, the software instruction translator 302 only translates a subset of a high-level language. The subset is defined such that statements that would not translate directly to instructions supported by the specialized processor (e.g., vector core coprocessor 104) are not part of the subset. In some embodiments, the presence of such disallowed statements in the source code 308 may cause the software instruction translator 302 to generate an error message. Additionally, the subset may include the definition of at least one type that is not part of the standard high-level language, but that adheres to the semantics of the high-level language. For example, C++ allows a user to define a type that is not included in standard C libraries. In some embodiments, the defined type corresponds to a vector representation of data on which the specialized instruction set 310 executing on a specialized processor (e.g., vector core coprocessor 104) operates.

The subset may include user-defined types, which are built into the software instruction translator 302 and therefore become part of the subset language. A user-defined type is a type, defined using the high-level language, that augments the high-level language's built-in types. User-defined types specify user-defined behavior and data layout for objects declared using a user-defined type. Classes in C++ are an example of user-defined types. The subset language may incorporate certain user-defined types implicitly. That is, the user-defined types act as built-in types in the subset language and thus a program written in the subset language may use these types without having to define them. Typically the behavior specified by these types corresponds to the operations of the specialized processor (e.g., the vector coprocessor core 104). For example, a C++ class that models the behavior of the vector operations of the vector coprocessor core 104 can be defined. This type is available as a built-in type in the subset language. Operations on objects declared using this type behave according to its implied definition, which corresponds directly to the vector operations of the specialized processor, permitting such operations in the subset language to be directly translated to the low-level language.

By implicitly defining a type that corresponds to the data on which the specialized processor performs operations, the software instruction translator 302 translates a statement written in the subset of the high-level language (i.e., statements in source code 308) directly to an instruction of the specialized instruction set 310. Additionally, the type definition may overload one or more operators of the high-level language to further enable each statement of the subset of the high-level language to directly map to an instruction of the specialized instruction set.

In accordance with various embodiments, the software instruction translator 302 directly maps a statement in the high-level language (e.g., contained in the source code 308) to an instruction in the specialized instruction set 310. In other words, the software instruction translator 302 ensures that there is a one-to-one correspondence between statements of the high-level language in which the source code 308 is written and instructions of the specialized instruction set 310. As explained above, this is enabled by utilizing a type definition that corresponds to the data format operated on by the specialized target processor (e.g., in the case of the vector core coprocessor 104, a vector type may be defined that corresponds to operands of the specialized instruction set of the vector core coprocessor 104). Additionally, as explained above, the software instruction translator 302 recognizes and translates overloaded operators defined in the type definition such that a statement in the high-level language (e.g., contained in the source code 308) using such an overloaded operator maps directly to an instruction in the specialized instruction set 310.

The software instruction translator 302 enables the direct mapping of statements in a high-level language to instructions in a low-level language, which is beneficial to developers who may be concerned with maximizing performance and/or efficiency of a specialized target processor. This is often the case where the specialized target processor is an accelerator, such as the vector core coprocessor 104 described above. Typically; a high-level language statement is compiled into tens, hundreds, or even more low-level instructions, which gives a developer very little control over the resulting low-level code. Direct mapping of statements in a high-level language to instructions in a low-level language provides developers with a higher degree of control over the instructions generated by the software instruction translator 302. Additionally, developers are able to generate source code 308 in an environment that may be compiled on any computer capable of compiling the high-level language. In the case where the high-level language is C++ or other prevalent programming languages, this allows the source code 308 to be compiled for processors or computers other than the specialized target processor, for example for code development or debugging. Further, developers often prefer to view a computer program in a high-level language format due to its familiar syntax and ease of identifying program flow. For example, a nested-loop control structure is easily viewed in C++ whereas deciphering the existence of a loop in assembly code is much more difficult.

The following explanation of an exemplary subset of a high-level language (e.g., source code 308) and its relation to a specialized instruction set 310 of a target processor is given in order to highlight certain aspects of the functionality of the software instruction translator 302. In the discussion below, the exemplary subset is a subset of C++, although one skilled in the art appreciates that subsets of other high-level languages may be similarly employed. A number of placeholder symbols are used in the following informal grammatical specification of the exemplary subset, which are defined here:

| LCV | : SYMBOL | // loop control variable |
|---|---|---|
| Agen | : SYMBOL | // address generator |
| Vreg | : SYMBOL | // vector register |
| TYPE | : SYMBOL or keyword | // for parameter declarations |
| K | : integer constant | // various contexts |
| <pexpr> | : C expression | // used to initialize P registers |

Loop control variables (LCVs) are loop counter variables that may appear in the loop header. In exemplary embodiments, a C identifier may be used for LCVs. "Agen" is a symbol that corresponds to an address generator and "Vreg" is a symbol that corresponds to vector registers (e.g., of the vector register file 206). Vector registers can be specified using symbolic names by declaring them as the exemplary type _vector. This type is an example of a user-defined C++ type as described above, which is implicitly incorporated into the subset language. Any C identifier may be used as the name of these registers. In this example, any identifier beginning with uppercase 'V' represents a Vreg (for example Vsrc, Vdest, Vpred). Integer constants may be required in various contexts and can be expressed using normal C syntax, for example 0xFF00 or 1234. In this example, any identifier beginning with uppercase 'K' represents an integer constant. A TYPE is a single-token expression of a C type, which will be explained in further detail below.

A <pexpr> is a C expression that is used to initialize a parameter register in the parameter block. These are parsed and evaluated when possible by the software instruction translator 302. In general any C expression that is valid where the <pexpr> is encountered may be used. However, a <pexpr> may not have side effects and a <pexpr> may not depend on the evaluation of any other expression in the program. In other words, a <pexpr>'s value must be invariant throughout the program. A <pexpr> cannot refer to an LCV, an Agen, a Vreg, or another <pexpr>. In various embodiments, the software instruction translator 302 may or may not check for adherence to these rules. For the purposes of this example, any identifier enclosed in angle brackets is a <pexpr>.

In some embodiments, idioms are available for <pexprs> to aid in computing addresses in a type-independent way. For example, for a parameter declared with a _vptr data type, the idiom sizeof(*p) evaluates to the size in bytes of each data element. For example, given the declaration "void kernel( . . . _vptr_int16 buffer)," the expression sizeof(*buffer) evaluates to 2. Additionally, the constant _VCOP_SIMD_WIDTH evaluates to the width (number of elements) of the SMD vector registers. As above where N=8, this value is 8.

The following is an abstract grammatical description of a function written in the subset language:

```
void SYMBOL ( <type> SYMBOL, <type> SYMBOL, ... )
{
    <declarations>
    <agen_statements>
    <init_statements>
    <vload_statements>
    for (LCV = 0; LCV < <pexpr>; LCV++)
    {
        <declarations>
        <agen_statements>
        <init_statements>
        <vload_statements>
        for (LCV = 0; LCV < <pexpr>; LCV++)
        {
            <declarations>
            <agen_statements>
            <init_statements>
            <vload_statements>
            for (LCV = 0; LCV < <pexpr>; LCV++)
            {
                <declarations>
                <agen_statements>
                <init_statements>
                <vload_statements>
                for (LCV = 0; LCV < <pexpr>; LCV++)
                {
                    <declarations>
                    <init_statements>
                    <agen_statements>
                    <vload_statements>
                    <vop_statements>
                    <vstore_statements>
```

```
            <vexit_statement>
          }
        }
        <vstore_statements>
      }
      <vstore_statements>
    }
    <vmove_statement>
    <vexit_label>
}
```

A program (e.g., source code 308) may contain many such functions, provided the function names are different. Additionally, each function can contain more than one loop which allows for the ability to perform multiple operations on a set of data in each function. The <pexpr> expressions may initialize parameters as shown below:

```
<declaration>:
        __vector    Vreg;
        __agen      Agen;
<init_statement>:
        Vreg.clear();              // Vreg = 0;
    |   Vreg = <pexpr>;            // VINIT
    |   Vreg = Vreg;               // VCMOV
<agen_statement>:
        Agen = LCV*<pexpr> + LCV*<pexpr> + LCV*<pexpr> +
            LCV*<pexpr>;
        Agen = 0;
<vload_statements>:
        Vreg = <pexpr> [ Agen ];
<vop_statement>:
        Vreg = Vreg op Vreg;
    |   Vreg = SYMBOL ( Vreg, Vreg, ... );
    |   Vreg = Vreg                // VOR
    |   if ( (LCV == 0) (&& (LCV == 0))* ) Vreg = Vreg;
                                   //VCMOV I<X>_ZERO
    |   if ( last(LCV,<pexpr>) (&& last(LCV, <pexpr>))* ) Vreg =
        Vreg;
                                   //VCMOV LAST_I<X>
    |   if (Vreg[0]) goto <name>;
<vstore_statement>
        <pexpr> [ Agen ] = Vreg;
        Vreg = Vreg;               // VCMOV
<vmove_statement>
        Veg = Vreg;                // VCMOV
<vexit_label>
        <identifier>:;
``` in the above example and in the examples that follow, comments such as "// VCMOV" and "// VINIT" indicate the instruction in the specialized instruction set to which the corresponding subset language instruction or high-level instruction translates.

In some embodiments, the return type of a function is required to be void. Parameter names, represented by "SYMBOL" below, may be any valid C identifier.

```
        void SYMBOL ( TYPE SYMBOL, TYPE SYMBOL, ... )
        {
        }
```

For parameters that are used as the base address of load and store operations, the "TYPE" above identifies the data type of the load and store, and may be one of the following: _vptr_int8 (signed 8-bit data), _vptr_uint8 (unsigned 8-bit data), _vptr_int16 (signed 16-bit data), _vptr_uint16 (unsigned 16-bit data), _vptr_int32 (signed 32-bit data), or _vptr_uint32 (unsigned 32-bit data). These are additional examples of user-defined types whose definitions may be incorporated into the subset language. These user-defined types correspond to the behavior of the memory addressing mode of the target processor. When the above function is called, the argument expressions corresponding to these parameters may have the corresponding built-in types. For example:

```
unsigned int my_data[SIZE];              // data buffer declaration in
                                         //   host code
void kernel(... __vptr_uint32 input ...); // kernel declaration
// call the kernel
kernel(... my_data ...);   // my_data[ ] implicitly converted to
                           //   __vptr_uint32
```

Parameters that are not used as a base address in the function can be declared using other C types. In some cases, the software instruction translator 302 requires that these parameter types be single tokens (e.g., "int" is acceptable while "unsigned int" is not). The software instruction translator 302 may translate a type definition that has been created to make a one-word type out of a previously-qualified type (e.g., const, volatile, or restrict). For example:

```
void kernel(    unsigned    a,      // OK, built-in one-word type
                MYTYPE*     b,      // OK, pointer to one-word type
                MYTYPE*     c[ ],   // OK, array of pointers
                MTTYPE      (*d)( ),// error: pointer to function
                volatile int *e)    // error: no qualifiers allowed
```

As explained above, in some embodiments, the software instruction translator 302 requires that the source code 308 adhere to a nested loop control structure. For example, the body of a function may consist of a "for" loop, with up to three additional loops nested within it, for a total of four nesting levels. In some embodiments, more or less nesting levels may be employed. For example, the outer loop may appear as:

```
        for (int LCV = 0; LCV < <pexpr>; ++LCV)
        {
            ...
        }
```

The loop control variable (LCV) may be any identifier. In some embodiments, the software instruction translator 302 requires that the LCV be declared in an initialization statement as int and initialized to 0. Additionally, the software instruction translator 302 requires that the comparison part of the loop statement be specified as LCV less than <pexpr>, where the <pexpr> represents the trip count of the loop, and the trip count be greater than zero, such that the loop executes at least once. The software instruction translator 302 also may require that the increment part increment the LCV by exactly one and the loop body must be enclosed in braces even if it consists of only one statement. The loop control structure of the specialized target processor may be exclusively specified by four values, corresponding to the trip counts of up to four nested loops. Thus, a set of loops in the subset language that meets the criteria explained above (e.g., LCV initialized to zero, termination condition as LCV less than <pexpr>, LCV incremented by exactly one) may be equivalently and fully expressed as the four <pexpr> values in the termination conditions. This allows such a set of loops to be directly translatable to the form required by the target processor.

In accordance with various embodiments, the software instruction translator 302 identifies vector registers (e.g., of the vector register file 206) specified with symbolic names that declared as type _vector. In this case, _vector is a user-defined type whose definition may be incorporated into the subset language as described above, and whose behavior models the vector registers of the target processor. The declaration should occur prior to the first reference to the symbol and any valid C identifier can be used. In some embodiments, if the identifier used is of the form V0, V1, . . . V15, then the software instruction translator 302 will map these registers directly to their corresponding hardware register name. This enables manual register allocation in programs (e.g., source code 308).

In some embodiments, initialization statements may take three different forms. The first type of initialization statement initializes all elements of a vector register from the given <pexpr>. For example:

```
Vreg = <pexpr> ;           // VINIT
Vreg.clear( );             // Equivalent to Vreg = 0;
```

As explained above, the "// VINIT" comment above indicates that the statement Vreg=<pexpr> translates to a VINIT instruction in the specialized instruction set.
The second type of initialization statement initializes all elements of a vector register to the current value of a LCV. This statement must appear within the loop controlled by the named LCV, which includes appearing in a nested inner loop of the loop controlled by the named LCV. For example:
    Vreg=LCV; // VINIT
The third type of initialization copies one vector register to another; this type may appear at any loop nesting level. For example:
    Vreg=Vreg; // VCMOV
The specialized instruction set 310 architecture may include, for example, eight address generators, each of which defines a pattern of stepping through memory. The pattern is specified by four values, each representing the amount to increment the address after each iteration of four nested loops. Computing the increment amounts to write low-level code is difficult. Thus, the software instruction translator 302 enables an expression using loop counter variables and coefficients and computes the increment amounts from the expression to translate the expression to the specialized instruction set. For example, address generators may be declared and initialized:

```
___agen Agen;                                                        //Agen declaration
Agen = LCV*<pexpr> + LCV*<pexpr> + LCV*<pexpr> + LCV*<pexpr> ;       //Agen initialization
Agen = 0 ;                                                           //Agen initialization
```

The general form of an address expression in a load or store is:

```
Vreg = <pexpr>[Agen];      // load
<pexpr>[Agen] = Vreg;      // store
```

Here, the software instruction translator 302 forms the address by adding the offset value in the address generator Agen to the base address represented by the <pexpr>. In some cases, the software instruction translator 302 supports an abstraction that allows per-iteration offsets to be expressed using a linear combination of coefficients and LCVs. The general for of such an expression may be a sum of products, where each addend is a product of an LCV and a coefficient <pexpr>. For example, the following illustrates the calculation of the address offset within a two-dimensional matrix:

```
for (int row = 0; row < nrows; ++row)
{
    for (int col = 0; col < ncols/___VCOP__SIMD__WIDTH; ++col)
    {
        A0 = row*ncols*sizeof(*input) + col*sizeof(*input);
        Vn = input[A0];
        ...
    }
}
```

In this example, the LCV5 are row and col. The coefficient <pexpr> for row is "ncols*sizeof(input)" and the coefficient for col is "sizeof(*input)". The sizeof expressions are necessary in this case because the offset in the Agen is in bytes.
The software instruction translator 302 translates vector load statements having a basic form:
    Vreg=<pexpr>[Agen];
Such a statement may be at any level of a function except outside of a loop containing a foreach( ) repeat loop structure. In addition, the load must be placed at the highest nested loop possible given the values of the Agen. For example, in a loop with indices I1, I2, I3 and I4, respective to nesting order, a load using an Agen defined by I1 and I2 must be placed in the I2 loop and not inside the I3 or I4 loops. This is because, in some embodiments, loads only occur in the vector core coprocessor 104 when an address changes. The <pexpr> represents the base address for the load. The <pexpr> must be a symbol from the parameter list declared with one of the _vptr types explained above. The software instruction translator 302 uses this type to determine the data type of the load. The specialized instruction set 310 may support various distribution options that control how data elements read from memory are mapped into the element of the vector register destination. These distribution options are specified though a modifier syntax that is taken from member function invocations in C++. The various modifiers are:

```
Vreg = <pexpr>[Agen].npt( );
Vreg = <pexpr>[Agen].onept( );
Vreg = <pexpr>[Agen].circ2( );
Vreg = <pexpr>[Agen].ds2( );
Vreg = <pexpr>[Agen].us2( );
```

-continued

```
Vreg = <pexpr>[Agen].dist(K1,K2,K3,K4,K5,K6,K7,K8);
Vreg = <pexpr>[Agen].dist( <pexpr> );
Vreg = <pexpr>[Agen].nbits( );
```

The "dist" modifier corresponds to a distribution option that is specified as an array of offsets, each of which specifies the offset of the memory datum to be loaded into one lane of the SAID vector. These offsets are in units of the memory data type. In the first form of the dist modifier, the array of offsets is given as a list of constant arguments to the modifier. In the second form of the dist modifier shown above, the vector is given as a pointer to (or array of) integers, where each element is given by <pexpr>[0], <pexpr>[1], and so on. Another distribution option may exist for deinterleaved loads, which reads data from memory into a pair of alternating registers. The destination pair of registers is specified using a pair syntax as follows:

|(Vreg1, Vreg2)=<pexpr>[Agen].deinterleave( );

In accordance with various embodiments, the software instruction translator 302 is configured to map the following high level statements (e.g., contained within source code 308) to a low-level language, for example the assembly code or machine language of the vector core coprocessor 104. In the descriptions below Vdst, Vsrc, Vsrc1 and Vsrc2 are variables declared as type _vector, corresponding to the vector registers of the vector core coprocessor 104. These are valid C++ statements, by virtue of the fact that overloaded operators and member functions are defined for the type _vector. The operators and methods are defined such that their definition specifies behavior that is identical to the operation of the corresponding vector operation on the vector core coprocessor 104, which enables the translation of these high-level language statements 308 directly to the low-level instructions 310. The high-level statements are shown below with the corresponding low-level translation as a comment:

```
Move
    Vdst = Vsrc;                              //  VCMOV/VOR
    if (LCV == 0 && ... LCV == 0) Vdst = Vsrc;  //  VCMOV
Add, Subtract
    Vdst = Vsrc1 + Vsrc2;                     //  VADD Vsrc1, Vsrc2, Vdst
    Vdst += Vsrc;                             //  VADD Vsrc, Vdst, Vdst
    Vdst += Vsrc1 + Vsrc2;                    //  VADD3 Vsrc1, Vsrc2, Vdst, Vdst
    Vdst = Vsrc1 + Vsrc2 + Vdst;              //  VADD3 Vsrc1, Vsrc2, Vdst, Vdst
    Vdst = Vsrc1 + hi(Vsrc2);                 //  VADDH Vsrc1, Vsrc2, Vdst
    Vdst = Vsrc1 − Vsrc2;                     //  VSUB Vsrc1, Vsrc2, Vdst
    Vdst −= Vsrc;                             //  VSUB Vdst, Vsrc, Vdst
    (Vsrc1, Vsrc2).addsub( );                 //  VADDSUB Vsrc1, Vsrc2
    Vdst += Vsrc1 − Vsrc2;                    //  VADIF Vsrc1, Vsrc2, Vdst, Vdst
    Vdst = Vsrc1 − Vsrc2 + Vdst;              //  VADIF Vsrc1, Vsrc2, Vdst, Vdst
Absolute Value
    Vdst = abs(Vsrc);                         //  VABS Vsrc, Vdst
    Vdst = abs(Vsrc1 − Vsrc2);                //  VABSDIF Vsrc1, Vsrc2, Vdst
    Vdst += abs(Vsrc1 − Vsrc2);               //  VSADD Vsrc1, Vsrc2, Vdst, Vdst
Multiply, Multiply/Accumulate
    Vdst = Vsrc1 * Vsrc2;                     //  VMPY Vsrc1, Vsrc2, Vdst
    Vdst += Vsrc1 * Vsrc2;                    //  VMADD Vsrc1, Vsrc2, Vdst, Vdst
    Vdst −= Vsrc1 * Vsrc2;                    //  VMSUB Vsrc1, Vsrc2, Vdst, Vdst
And, Or, Xor
    Vdst = Vsrc1 & Vsrc2;                     //  VAND Vsrc1, Vsrc2, Vdst
    Vdst &= Vsrc;                             //  VAND Vsrc, Vdst, Vdst
    Vdst &= Vsrc1 & Vsrc2;                    //  VAND3 Vsrc1, Vsrc2, Vdst, Vdst
    Vdst = Vsrc1 & Vsrc2 & Vdst;              //  VAND3 Vsrc1, Vsrc2, Vdst, Vdst
    Vdst = Vsrc1 & ~Vsrc2;                    //  VANDN Vsrc1, Vsrc2, Vdst
    Vdst &= ~Vsrc;                            //  VANDN Vdst, Vsrc, Vdst
    Vdst = Vsrc1 | Vsrc2;                     //  VOR Vsrc1, Vsrc2, Vdst
    Vdst |= Vsrc;                             //  VOR Vsrc, Vdst, Vdst
    Vdst |= Vsrc1 | Vsrc2;                    //  VOR3 Vsrc1, Vsrc2, Vdst, Vdst
    Vdst = Vsrc1 | Vsrc2 | Vdst;              //  VOR3 Vsrc1, Vsrc2, Vdst, Vdst
    Vdst = Vsrc1 ^ Vsrc2;                     //  VXOR Vsrc1, Vsrc2, Vdst
    Vdst ^= Vsrc;                             //  VXOR Vsrc, Vdst, Vdst
Shift
    Vdst = Vsrc1 << Vsrc2;                    //  VSHF Vsrc1, Vsrc2, Vdst
    Vdst |= Vsrc1 << Vsrc2;                   //  VSHFOR Vsrc1, Vsrc2, Vdst, Vdst
Min, Max
    Vdst = min(Vsrc1, Vsrc2);                 //  VMIN Vsrc1, Vsrc2, Vdst
    Vdst = max(Vsrc1, Vsrc2);                 //  VMAX Vsrc1, Vsrc2, Vdst
    (Vsrc1, Vsrc2).minmax( );                 //  VSORT2 Vsrc1, Vsrc2
    (Vsrc2, Vdst:2) = minf(Vsrc1, Vsrc2)      //  VMINSETF Vsrc1, Vsrc2, Vsrc2,
                                              //      Vdst2
    (Vsrc2, Vdst2) = maxf(Vsrc1, Vsrc2 )      //  VMAXSETF Vsrc1, Vsrc2, Vsrc2,
                                              //      Vdst2
Comparisons
    Vdst = Vsrc1 == Vsrc2;                    //  VCMPEQ Vsrc1, Vsrc2, Vdst
    Vdst = Vsrc1 > Vsrc2;                     //  VCMPGT Vsrc1, Vsrc2, Vdst
    Vdst = Vsrc1 < Vsrc2;                     //  VCMPGT Vsrc2, Vsrc1, Vdst
    Vdst = Vsrc1 >= Vsrc2;                    //  VCMPGE Vsrc1, Vsrc2, Vdst
    Vdst = Vsrc1 <= Vsrc2;                    //  VCMPGE Vsrc2, Vsrc1, Vdst
    Vdst = !Vsrc;                             //  VNOT Vsrc, Vdst
    Vdst = pack(Vsrc1 >= Vsrc2);              //  VBITPK Vsrc1, Vsrc2, Vdst
Conditional Assignment
    Vdst = select(Vsrc1, Vsrc2, Vdst);        //  VSEL Vsrc1,Vsrc2,Vdst,Vdst
    Vdst = unpack(Vsrc1, Vsrc2);              //  VBITUNPK Vsrc1, Vsrc2, Vdst
    (Vsrc1, Vsrc2).swap(Vcond);               //  VSWAP Vcond, Vsrc1, Vsrc2
Bit Manipulation
    Vdst = round(Vsrc1, Vsrc2);               //  VRND Vsrc1, Vsrc2, Vdst
    Vdst = apply_sign(src1, src2);            //  VSIGN Vsrc1, Vsrc2, Vdst
    Vdst = count_bits(Vsrc);                  //  VBITC Vsrc, Vdst
    Vdst = reverse_bits(Vsrc);                //  VBITR Vsrc, Vdst
```

| | | |
|---|---|---|
| Vdst = transpose_bits(Vsrc); | // | VBITTR Vsrc, Vdst |
| Vdst = leading_bit(Vsrc1, Vsrc2); | // | VLMBD Vsrc1, Vsrc2, Vdst |
| Vdst = binlog(Vsrc); | // | VBINLOG Vsrc, Vdst |
| Vdst = interleave_bits(Vsrc1, Vsrc2); | // | VBITI Vsrc1, Vsrc2, Vsrc3 |
| (Vdst1, Vdst2) = deinterleave_bits(Vsrc); | // | VBITDI Vsrc, Vdst1, Vdst2 |
| (Vdst1, Vdst2) = jus16(Vsrc); | // | VSHF16 Vsrc, Vdst1, Vdst2 |
| Interleave, Deinterleave | | |
| (Vsrc1, Vsrc2).interleave( ); | // | VINTRLV Vsrc1,Vsrc2 |
| (Vsrc1, Vsrc2).deinterleave( ); | // | VDINTRLV Vsrc1, Vsrc2 |
| (Vsrc1, Vsrc2).interleave2( ); | // | VINTRLV2 Vsrc1,Vsrc2 |
| (Vsrc1, Vsrc2).interleave4( ); | // | VINTRLV4 Vsrc1,Vsrc2 |
| (Vsrc1, Vsrc2).deinterleave2( ); | // | VDINTRLV2 Vsrc1, Vsrc2 |

The software instruction translator 302 may require that the operands of the above instructions be of the same type listed here. The software instruction translator 302 may also allow balanced parentheses in operations not involving function calls or left shifts to aid in readability.

The basic form of a vector store statement is:

<pexpr>[Agen]=Vreg;

In some embodiments, the software instruction translator 302 requires store statements to follow vector operation statements in the outermost loop or a nested inner loop. The <pexpr> represents the base address for the store statement. The <pexpr> must be a symbol from the parameter list declared with one of the _vptr types explained above. The software instruction translator 302 uses this type to determine the data type of the store. As with loads, various distribution options that control how data elements are mapped from elements of the vector register into memory are available. These are specified through a modifier syntax applied to the address expression, for example:

```
<pexpr>[Agen].npt( ) = Vreg;
<pexpr>[Agen].onept( ) = Vreg;
<pexpr>[Agen].ds2( ) = Vreg;
<pexpr>[Agen].offset_np1( ) = Vreg;
<pexpr>[Agen].s_scatter(Vindex) = Vreg;
<pexpr>[Agen].p_scatter(Vindex) = Vreg;
<pexpr>[Agen].skip( ) = Vreg;
```

The scatter form uses the elements of the Vindex vector as offsets to store the corresponding elements of the source vector. The index vector register may use byte offsets. No more than one vector register can be used as scatter's offset registers. The difference between s_scatter( ) and p_scatter( ) is that s_scatter( ) takes 8 cycles to store 8 values while p_scatter( ) stores in parallel and takes 1 cycle. However, the p_scatter( ) distribution causes errors when duplicate memory locations are detected, whereas s_scatter( ) forces the latest duplicate to take precedence.

In some embodiments, store operations may be predicated by the elements of a vector register. For example:

<pexpr>[Agen]=Vreg.predicate(Vpred);

A zero element in the predicate register blocks the store of the corresponding element of the source register. A predicate can be used in conjunction with the distribution options above, for example:

data[A0].ds2( )=Vsrc.predicate(Vindex);

Note that the vector core coprocessor 104 hardware may require registers V1, V2 and V3 to be the predicate register. In addition, loads may only go into even registers (e.g., V0, V2, . . . , V14). As a result, to load more than one register for predication, the user must bad the values into an intermediate register and then move it into another register. The software instruction translator 302 may ensure that the move places the values into one of the three predicate registers.

Interleaved store operations store elements from an alternating pair of vector registers into memory. This is specified using the same pair syntax as interleaved bads, explained above:

<pexpr>[Agen].interleave( )=(Vreg1, Vreg2);

The software instruction translator 302 may not allow interleaved stores to be predicated, but predication may be performed by first interleaving the two vector registers, and then performing two n-point predicated stores.

Collating store operations are similar to predicated stores in that the predicate register controls which elements of the source vector are written:

<pexpr>[collate(Vpred)]=Vsrc;

However, in collating store, each element for which the predicate is true is written sequentially, whereas in the predicated store each element is written at its normal location according to the address generator and the distribution option. In this way, the collating store is the inverse of an expanding load. To indicate that a loop is to be used for a collate store, the user must designate a single base address that will be used as the target of the store. To do this, a function similar to the following is called just before the first for loop. Note that this should not be called before a foreach( ) repeat loop, but instead the first for loop inside the repeat loop:

_COLLATE(<pexpr>);

Collating stores do not have explicit address generators associated with them. Each such store has a built-in implicit address generator that is initialized from the base address <pexpr>. Each time the store executes, the address generator is incremented by the number of items stored, corresponding to the number of non-zero elements in the predicate register. The <pexpr> used for collating stores can only be used for one store within the program. For example:

| | | |
|---|---|---|
| output[collate(V1)] = Vsrc1; | | |
| output[collate(V2)] = Vsrc2; | // | error, 'output' used for two collating stores |

In some embodiments, the software instruction translator 302 does not permit collating stores to be used with other distribution options.

Saturation occurs in two contexts: stores, and selected vector operations. Saturation is expressed via the saturate( ) modifier applied to the vector register on the right-hand-side of the assignment. There are several forms, corresponding to the saturation modes of the hardware:

```
<pexpr>[Agen] = Vreg;                                    // no saturation
<pexpr>[Agen] = Vreg.saturate( );                        // saturate to type of <pexpr>
<pexpr>[Agen] = Vreg.saturate(-K, K);                    // SYMM, signed data
<pexpr>[Agen] = Vreg.saturate(0, K);                     // SYMM, unsigned data
<pexpr>[Agen] = Vreg.saturate(K1, K2);                   // ASYMM, K1 == -K2-1
<pexpr>[Agen] = Vreg.saturate(<bits>);                   // ASYMM, half-open interval
                                                         //   [2^(bits-1), 2^(bits-1))
<pexpr>[Agen] = Vreg.saturate(<min>, <minset>, <max>, <maxset>); // 4PARAM
<pexpr>[Agen] = Vreg.saturate(<min>, <max>);             // 4PARAM, with maxset=max,
                                                         // minset=min
```

Both SYM and ASYMM modes require constant bounds (i.e., non-constant expressions used as saturation bounds always generate the 4PARAM form). Additionally, the ASYMM forms generate errors in the cases of unsigned data and the ASYMM form requires that the expressions be in exactly one of the two forms shown. The software instruction translator 302 may additionally check that the expressions used as arguments to the 4PARAM forms are all <pexprs> that fit in 16 bits. In some embodiments, rounding is applied to store instructions separately or in conjunction with saturation. Rounding is expressed with the round( ) modifier:

```
<pexpr>[Agen] = Vreg;                      // no rounding
<pexpr>[Agen] = Vreg.round(<bits>);        // value = (value +
                                           //   1<<(bits-1)) >> bits;
<pexpr>[Agen] = Vreg.truncate(<bits>);     // value = value >> bits;
```

As used above, <bits> is a <pexpr>, so it may be a constant or an expression; if it is an expression, the software instruction translator 302 may require that its value be between 0 and 39. In some cases, rounding, saturation and predication may be combined. For example:

```
data[Agen] = Vreg.round( ... ).saturate( ... );    // combine rounding and
                                                   //   sat.
data[Agen] = Vreg.saturate( ... ).predicate(Vn);   // combine sat. and
                                                   //   predication
```

As above, the above constructs comprise valid C++ code, which use member functions defined for the class _vector that models the rounding, truncation, saturation, and prediction operations of the coprocessor 104.

Although described above with respect to stores, rounding may also be available for some operations. The software instruction translator 302 may understand rounding in three modes: rounding, truncation, and left shift, which may be specified as a modifier on the result expression:

```
Vdst = (vector expression).round(<bits>);       // rnd_mode = round
Vdst = (vector expression).truncate(<bits>);    // rnd_mode = truncate
Vdst = (vector expression) << <bits>;           // rnd_mode = left-shift
```

As an additional example:

```
Vdst = (Vsrc1 * Vsrc2).round(15);      // VMPY with rounding
Vdst += (Vsrc1 * Vsrc).truncate(15);   // VMADD with truncation
Vdst += (Vsrc1 * Vsrc2) << 1;          // VMADD with left shift
```

The software instruction translator 302 may generate circular buffers for circular addressing on loads and stores. In some embodiments, the software instruction translator 302 supports the use of buffers of size 1K, 2K, 4K, 8K, 16K and 32K. The following syntax at the end of a <pexpr>-Agen pair can be used to trigger the software instruction translator 302 to generate a circular buffer:

<pexpr>[<agen>] % CIRC <SZ>; //<SZ> is 1K, 2K, 4K, 8K, 16K, or 32K

The index load loads a vector register with a number of indices that will be used to access various bins in the histogram. This instruction is as a normal load with the constraint that distribution may only be 1PT, NPT, US2, DS2, or NBITS. These correspond to distribution modes of the vector core coprocessor 104. Generally, a vector load reads multiple values from memory and stores them in multiple files or "lanes" of a vector register. Here, "distribution" refers to which values go into a certain lane. For example, 1PT means a single value is read and then written to all lanes. NPT means N values are read and written to N consecutive lanes. The others refer to different mapping of values to lanes. The NBITS load mode is only supported for 1 or 8 parallel histograms. Increments for the various histogram bins being loaded can either be initialized through a regular initialization or a load. If a load is used, the base address must be either 8 or 16 bits, the base address must have the same sign as the histogram base address, and the base address must be smaller or equal in size to the histogram base address. In addition, a pseudo-distribution must be used to differentiate between the index load and the weight load:

Vreg=<pexpr>[agen].weight_load( );

The final instruction in a histogram loop is an update instruction. The update instruction loads the histogram bin, increments the histogram bin, and stores the histogram bin. Before the load, the index register values may be rounded or saturated by attaching any of the modifiers explained above to the index register's identifier. After being loaded and incremented, the data values may be saturated to the minimum/maximum values of the histogram's type and stored back into the histogram base address. The results of the histogram bins after incrementing are stored within "Vreg".

In accordance with various embodiments, the software instruction translator 302 may translate a number of other loop types that are supported by the specialized target processor, such as the vector core coprocessor 104. Similar constraints to those found above may be required, depending on the type of loop and the requirements of the specialized target processor.

In accordance with various embodiments, the software instruction translator 302 may be limited in its use so that the efficient translation of high-level input source code 308) and low-level output (i.e., specialized instruction set 310) may be maintained. For example, the software instruction translator 302 may require a programmer to adhere to a particular syntax even though statements not adhering to the particular syntax would be otherwise-valid statements of the high-level language, such as C++. If the particular syntax is not adhered to, the software instruction translator 302 may generate an error to the user, which would not normally be generated if dealing with a normal compiler of the high-level language.

In addition to generating errors as a result of not adhering to a particular syntax (which may impose meaningful limits on the high-level language), the software instruction translator 302 may generate errors in response to a number of other programming mistakes that would lead to improper translation to the specialized instruction set, or that are not supported by the specialized instruction set. For example, an error may be generated if source code 308 contains an unsupported number of loops, a loop is of an unsupported length, and the like. Similarly, an error may be generated if source code 308 does not adhere to instruction limits (e.g., imposed by the vector core coprocessor 104 hardware design) such as number of loads, stores, init statements, Agen statements, or arithmetic operations in a loop. Various errors may also be generated if source code 308 does not adhere to execution rules of the specialized target processor, such as location or ordering of operations, definitions, initializations and the like. In general, the software instruction translator 302 may generate errors based on many different causes; in particular, however, the software instruction translator 302 may generate errors in cases where a statement is otherwise-legal in the high-level language, but is not suitable for efficient translation to the specialized instruction set. Thus, the software instruction translator 302 ensures that a user develops source code 308 that adheres to the constructs of the specialized instruction set of the target processor and can be efficiently translated into the specialized instruction set.

Figure 4:
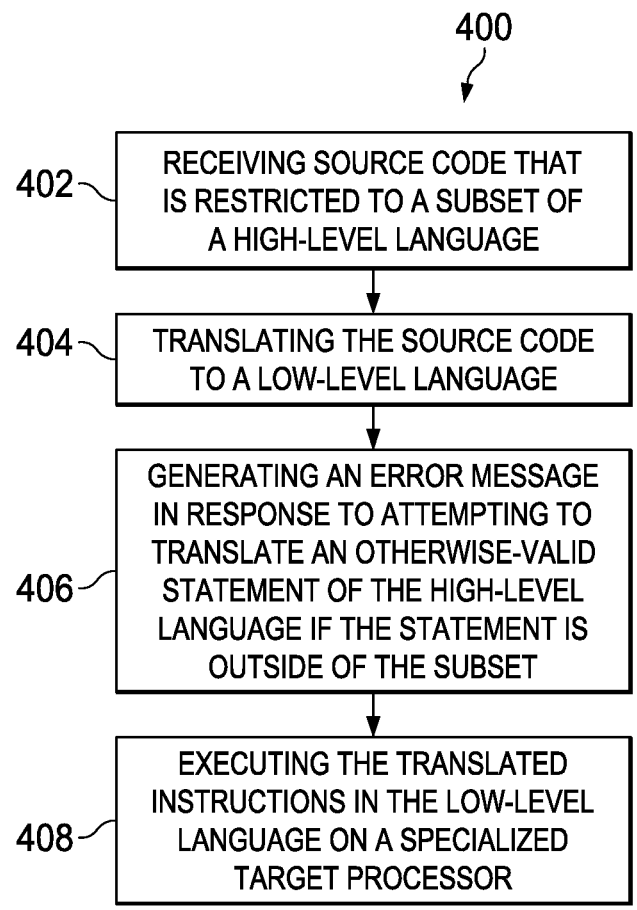
FIG. 4 shows a method flow chart in accordance with various embodiments.

Referring now to FIG. 4, a method 400 is shown in accordance with various embodiments. The method 400 begins in block 402 with receiving source code 308 that is restricted to a subset of a high-level language. As explained above, the subset is defined such that statements that would translate to instructions not supported by the specialized processor (e.g., vector core coprocessor 104) are not part of the subset. In some embodiments, the presence of such disallowed statements in the source code 308 may cause the software instruction translator 302 to generate an error message.

Additionally, the subset may include the definition of at least one type that is not part of the standard high-level language, but that adheres to the semantics of the high-level language. The subset may include user-defined types, which are built into the software instruction translator 302 and therefore become part of the subset language. For example, C++ allows a user to define a type that is not included in standard C libraries. A user-defined type is a type, defined using the high-level language, that augments the high-level language's built-in types. User-defined types specify user-defined behavior and data layout for objects declared using a user-defined type. Classes in C++ are an example of user-defined types. The subset language may incorporate certain user-defined types implicitly. That is, the user-defined types act as built-in types in the subset language and thus a program written in the subset language may use these types without having to define them. Typically the behavior specified by these types corresponds to the operations of the specialized processor (e.g., the vector coprocessor core 104). For example, a C++ class that models the behavior of the vector operations of the vector coprocessor core 104 can be defined. This type is available as a built-in type in the subset language. Operations on objects declared using this type behave according to its implied definition, which corresponds directly to the vector operations of the specialized processor, permitting such operations in the subset language to be directly translated to the low-level language.

The method 400 continues in block 404 with translating the source code 308 to a low-level language, which is a specialized instruction set 310. The specialized instruction set is a low-level language that is executable by a specialized target processor such as the vector core coprocessor 104. In accordance with various embodiments, a statement in the high-level language source code 308 is translated directly to an instruction in the specialized instruction set 310; in other words, a statement maps directly to an instruction.

In some embodiments, the method 400 continues in block 406 with generating an error message in response to attempting to translate an otherwise-valid statement of the high-level language if the statement is outside of the subset. As explained above, not all statements of the high-level language are legal or able to be translated to the specialized instruction set 310, despite their being normally-valid statements in the high-level language. The software instruction translator 302 detects such illegal, but otherwise-valid, statements and may optionally generate an error message if such statements are included in the source code 308. In some other embodiments, the method 400 continues in block 408 with executing the translated instructions in the low-level language on a specialized target processor, such as the vector coprocessor core 104 explained above.

The above discussion is meant to be illustrative of the principles and various embodiments of the present invention. For example, various specialized target processors may have requirements similar to or different from the vector core coprocessor 104 described herein. Software instruction translators for differing specialized target processors are within the scope of the present disclosure. Numerous other variations and modifications will become apparent to those skilled in the art once the above disclosure is fully appreciated. It is intended that the following claims be interpreted to embrace all such variations and modifications.

What is claimed is:

1. A computer system comprising:
a processor; and
program storage coupled to said processor;
wherein the program storage stores a software instruction translator that, when executed by the processor, is configured to receive source code, the source code restricted to a subset of valid statements of a high-level language, and translate the source code to a low-level language;
wherein the low-level language comprises a specialized instruction set;
wherein each statement of the subset of the high-level language directly maps to an instruction of the low-level language; and
wherein the software instruction translator is configured to generate an error message in response to an attempt to translate an otherwise-valid statement of the high-level language if the statement is outside of the subset.

2. The computer system of claim 1 wherein the subset of the high-level language comprises a definition of a type that is not built into the standard high-level language, but that adheres to the semantics of the high-level language.

3. The computer system of claim 2 wherein the type corresponds to a vector data type on which the specialized instruction set operates.

4. The computer system of claim 2 wherein the definition of the type overloads an operator of the high-level language.

5. The computer system of claim 2 wherein the definition of the type corresponds to an addressing scheme of the specialized instruction set.

6. The computer system of claim 1 wherein the software instruction translator requires that the source code follow a nested-loop control structure.

7. A method comprising the steps of:
receiving source code that is restricted to a subset of valid statements of a high-level language; and
translating the source code to a low-level language;
wherein the low-level language comprises a specialized instruction set;
wherein each statement of the subset of the high-level language directly maps to an instruction of the low-level language; and
wherein the translating step generates an error message in response to an attempt to translate an otherwise-valid statement of the high-level language if the statement is outside of the subset.

8. The method of claim 7 wherein the subset of the high-level language comprises a definition of a type that is not built into the standard high-level language, but that adheres to the semantics of the high-level language.

9. The method of claim 8 wherein the type corresponds to a vector data type on which the specialized instruction set operates.

10. The method of claim 8 wherein the definition of the type overloads an operator of the high-level language.

11. The method of claim 7 wherein translating the source code requires that the source code follow a nested-loop control structure.

12. The method of claim 7 further comprising executing the translated instructions in the low-level language on a specialized target processor.

13. A non-transitory computer-readable medium containing instructions that, when executed by a processor, cause the processor to:
receive source code that is restricted to a subset of valid statements of a high-level language; and
translate the source code to a low-level language;
wherein the low-level language comprises a specialized instruction set;
wherein each statement of the subset of the high-level language directly maps to an instruction of the low-level language; and
wherein the translating generates an error message in response to an attempt to translate an otherwise-valid statement of the high-level language if the statement is outside of the subset.

14. The non-transitory computer-readable medium of claim 13 wherein the subset of the high-level language comprises a definition of a type that is not built into the standard high-level language, but that adheres to the semantics of the high-level language.

15. The non-transitory computer-readable medium of claim 14 wherein the type corresponds to a vector data type on which the specialized instruction set operates.

16. The non-transitory computer-readable medium of claim 13 wherein translating the source code requires that the source code follow a nested-loop control structure.

17. The non-transitory computer-readable medium of claim 13 wherein the instructions, when executed by the processor, cause the processor to load the translated instructions in the low-level language onto a specialized target processor for execution.

* * * * *